United States Patent [19]
Scott et al.

[11] Patent Number: 5,987,123
[45] Date of Patent: Nov. 16, 1999

[54] SECURE FILE SYSTEM

[75] Inventors: Glenn C. Scott; Benjamin J. Stoltz, both of Mountain View, Calif.

[73] Assignee: Sun Microsystems, Incorporated, Palo Alto, Calif.

[21] Appl. No.: 08/675,687

[22] Filed: Jul. 3, 1996

[51] Int. Cl.[6] .................................................. H04L 9/00
[52] U.S. Cl. ............................................................ 380/4
[58] Field of Search .............................. 380/3, 4, 21, 23, 380/25, 28, 30

[56] References Cited

U.S. PATENT DOCUMENTS

| | | | |
|---|---|---|---|
| 3,893,084 | 7/1975 | Kotok et al. | 340/172.5 |
| 4,652,990 | 3/1987 | Pailen et al. | 380/4 |
| 4,713,753 | 12/1987 | Boebert et al. | 380/4 |
| 4,919,545 | 4/1990 | Yu | 380/25 |
| 5,283,830 | 2/1994 | Hinsley et al. | 380/25 |
| 5,289,540 | 2/1994 | Jones | 380/4 |
| 5,412,717 | 5/1995 | Fischer | 380/4 |
| 5,568,554 | 10/1996 | Eastlake, III | 380/25 |
| 5,649,099 | 7/1997 | Theimer et al. | 395/187.01 |
| 5,680,461 | 10/1997 | McManis | 380/25 |
| 5,692,047 | 11/1997 | McManis | 380/4 |
| 5,825,877 | 10/1998 | Dan et al. | 380/4 |

*Primary Examiner*—William Oen
*Assistant Examiner*—Robin Clark
*Attorney, Agent, or Firm*—Graham & James LLP

[57] ABSTRACT

A method and apparatus that allows a computer system to trust both program and data files without the intervention of the user and without the possibility of circumventing the model of trust. A file system incorporates two levels of validation for programs and data. A first level of validation specifies sources that the user has decided are trustworthy or untrustworthy. A second level of validation specifies sources that the system itself considers trustworthy or untrustworthy. For data to be acceptable, it must be acceptable to both levels of checking. In addition, both the user and the system can specify multiple acceptable signatures and further allows various ones of the multiple signatures to have different levels of access to the system.

17 Claims, 7 Drawing Sheets

| | Entity Name (1302) | Type (304) | Public Key (306) | Permissions c d r w e x (308) |
|---|---|---|---|---|
| 1 | Ben | single key | aaaaaaa | x x x x x |
| | Glover | single key | bbbbbbb | x |
| | Bryn | single key | ccccccc | x         x |
| | Geoff | DB Ref | pointer to data base | x |
| | ... | ... | ... | ... |
| N | any | any | N/A | x |

320

FIG. 3
Signature Data Structure

SECURE FILE SYSTEM

FIELD OF THE INVENTION

This application relates to operating systems and, more particularly, to a file system that validates an entity attempting a file access before allowing the entity to perform file operations.

BACKGROUND OF THE INVENTION

In recent years, the internet has become extremely popular. Using the internet, users can download files into the memory of their computers easily and cheaply. One problem with such a process is that the user has no way of knowing whether the party supplying the software is trustworthy. Software supplied from untrusted sources can contain unexpected "bugs" and might even be completely different from the software the user expects to receive. For example, software from untrusted sources may contain a computer virus that is not detected until the software is executed.

In fact, such problems can arise with any software or data obtained from outside sources. Computer programs and computer data files are normally stored on computer systems without the capability of automatically sensing that programs and data are 1) authentic and 2) unmolested. Conventional methods of checking for authenticity and noncorruption require action on the part of human beings. Application programs verify data by fixed checksums, both with and without cryptographic assurance. What is needed is a truly automatic and transparent method of checking and authenticating software and data in a computer system.

SUMMARY OF THE INVENTION

The present invention overcomes the problems and disadvantages of the prior art by providing a method and apparatus that allows a computer system to trust both program and data files without the intervention of the user and with a decreased possibility of circumventing the model of trust.

A preferred embodiment of the present invention includes two levels of validation for programs and data. A first level of validation specifies sources that the user has decided are trustworthy (or not trustworthy). A second level of validation specifies sources that the system itself considers trustworthy or untrustworthy. For data to be acceptable, it must be acceptable to both levels of checking. Thus, for example, if the user decides to accept all data from entity "A", but the system has decided not to accept all data from entity "A," the file system would not store data from entity "A." As a further example, if the user has decided to accept no data from "B", but the system has decided to accept all data from "B", then no data from "B" would be stored on the system.

In addition, a preferred embodiment of the present invention allows the user and the system to specify multiple acceptable signatures and further allows various ones of the multiple signatures to have different levels of access to the system (i.e., different permissions). A preferred embodiment the present invention can be implemented so as to be transparent to the user and to co-exist with existing file systems.

In accordance with the purpose of the invention, as embodied and broadly described herein, a preferred embodiment of the present invention is a method of performing a file access, comprising the steps, performed by a data processing system having a memory, of: receiving an indication that an entity desires to perform a file access operation on a file of the data processing system; obtaining an affidavit of the file; checking that the affidavit is acceptable in accordance with a user signature data structure stored in the memory; checking that the affidavit is acceptable in accordance with the system signature data structure stored in the memory; and allowing the file access operation when the affidavit is acceptable in accordance with both the user signature data structure and the system signature data structure.

In further accordance with the purpose of the invention, as embodied and broadly described herein, a preferred embodiment of the present invention is a method of creating a secure file, comprising the steps, performed by a data processing system having a memory, of: receiving an indication that an entity desires to perform a file access operation on a file of the data processing system; obtaining a private key of the entity; receiving data of the file to be created; determining a checksum of the file; encrypting the checksum using the private key, and creating the file and an associated affidavit that includes the encrypted checksum.

In further accordance with the present invention, as embodied and broadly described herein, a preferred embodiment of the present invention is: a signature data structure stored in a memory of a data processing system, comprising: a first entity field storing a name of an entity trusted to perform a file access; a first public key field storing a public key of the first entity; a second entity field storing a name of an entity trusted to perform a file access; and a second public key field storing a public key of the second entity.

Advantages of the invention will be set forth in part in the description which follows and in part will be obvious from the description or may be learned by practice of the invention. Advantages of the invention will be realized and attained by a combination of the elements particularly pointed out in the appended claims and equivalents.

BRIEF DESCRIPTION OF THE FIGURES

The accompanying drawings, which are incorporated in and constitute a part of this specification, illustrate several embodiments of the invention and, together with the description, serve to explain the principles of the invention.

FIG. 3 shows an example of a user signature data structure or a system signature data structure of FIG. 1.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
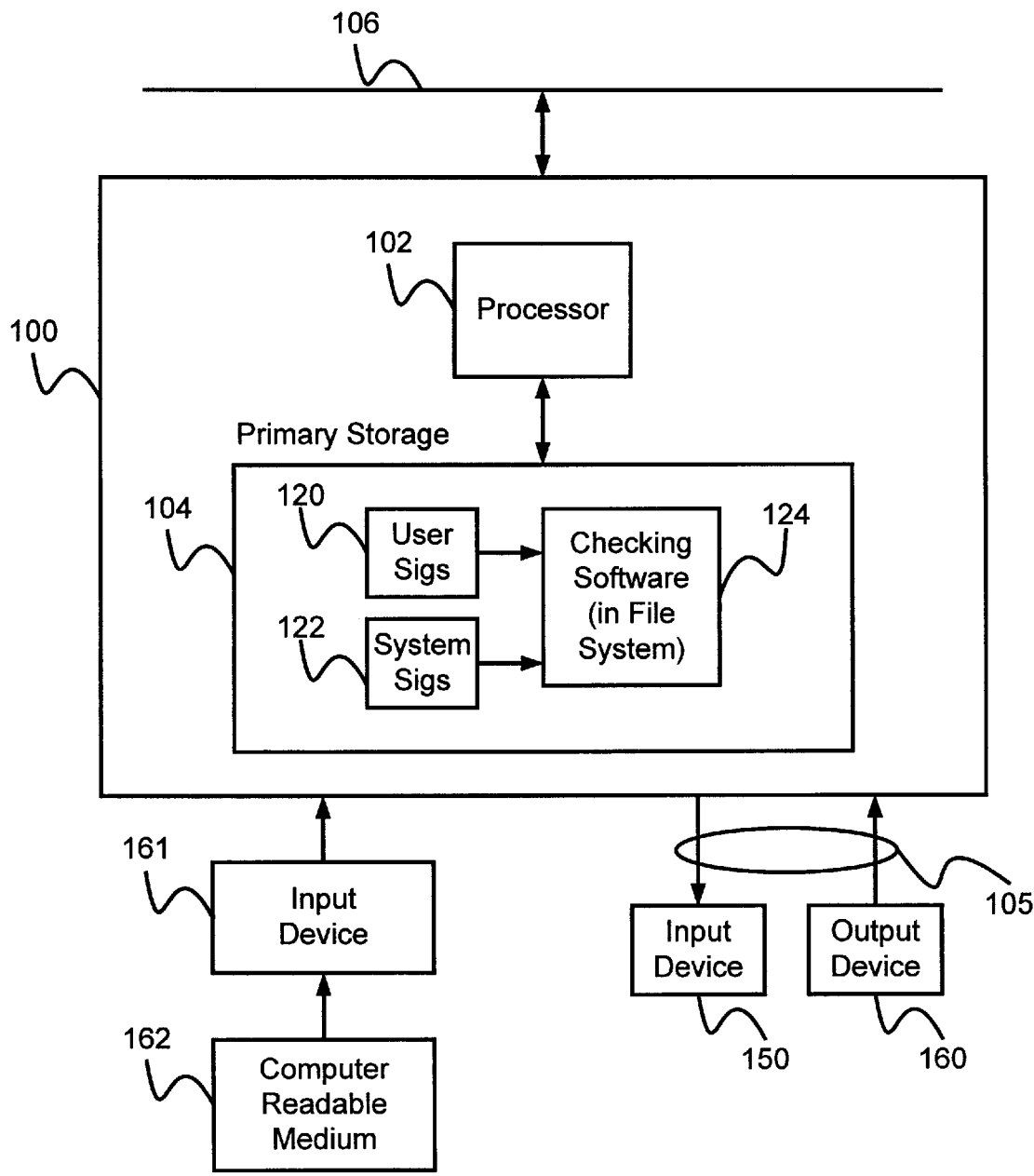
FIG. 1 is a block diagram of a computer system in accordance with a preferred embodiment of the present invention.

FIG. 1 is a block diagram of a computer system 100 in accordance with a preferred embodiment of the present invention. Computer system 100 is connected to line 106, which can be, for example, a LAN, a WAN, or an internet connection. Line 106 can also represent a wireless connection, such as a cellular network connection.

Computer system 100 includes a CPU 102; a primary storage 104; input/output lines 105; an input device 150, such as a keyboard or mouse; and a display device 160, such as a display terminal Primary storage 104 can include any type of computer storage including, without limitation, random access memory (RAM), read-only memory (ROM), and storage devices which include magnetic and optical storage media such as magnetic or optical disks. Computer system 100 further includes an input device 161 for reading a computer usable medium 162 having computer readable program code means embodied therein. Input device 161 is, for example, a disk drive.

Primary storage 104 includes a data structure 120 containing user signatures and a data structure 122 containing system signatures, as discussed below in connection with FIG. 2. Memory 104 also includes signature checking software 124, which is also discussed below.

A person of ordinary skill in the art will understand that memory 104 also contains additional information, such as application programs, operating systems, data, etc., which are not shown in the figure for the sake of clarity. It will be understood by a person of ordinary skill in the art that computer system 100 can also include numerous elements not shown in the figure for the sake of clarity, such as additional disk drives, keyboards, display devices, network connections, additional memory, additional CPUs, LANs, input/output lines, etc. A preferred embodiment of the invention runs under the Solaris operating system, Version 2.3 and higher. Solaris is a registered trademark of Sun Microsystems, Inc.

Figure 2:
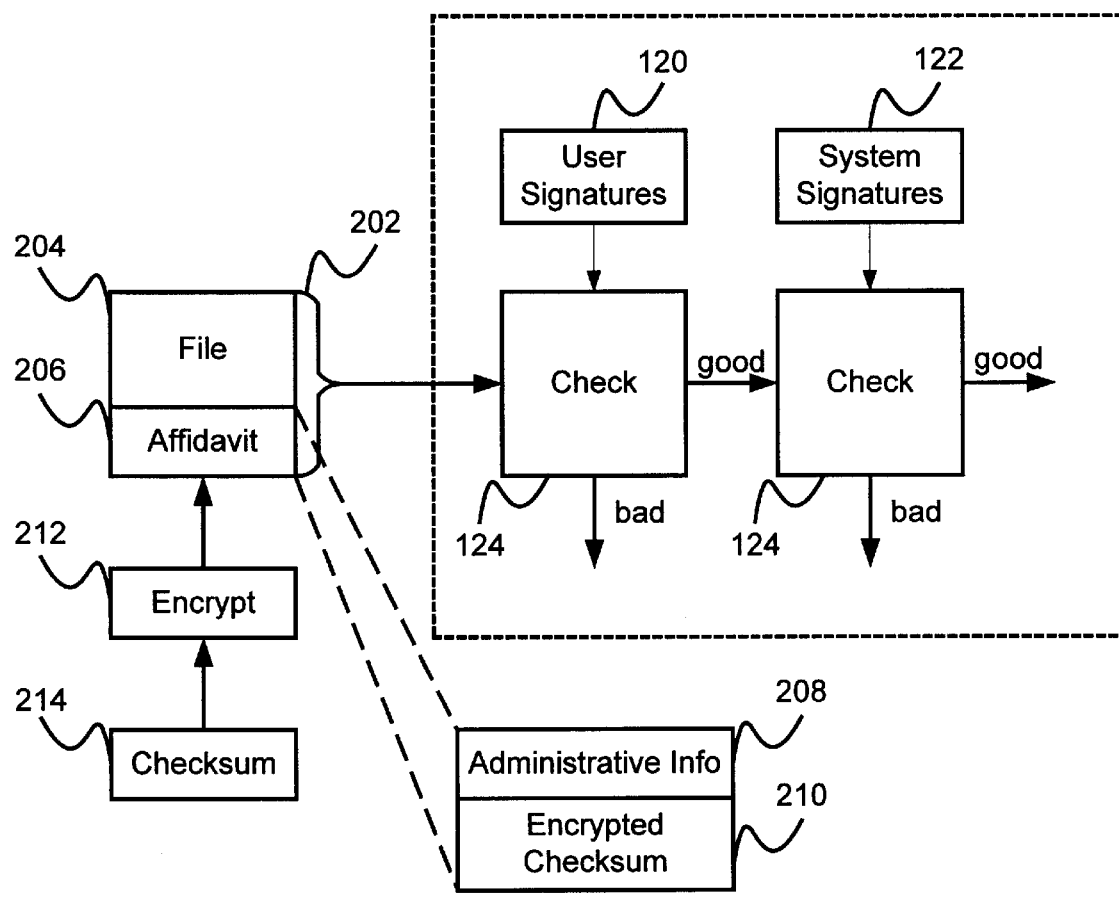
FIG. 2 is a block diagram showing a data flow of a preferred embodiment of the present invention.

FIG. 2 is a block diagram showing a data flow in a preferred embodiment of the present invention. File 202 has an associated affidavit 206 (also called a "cryptographic Affidavit.") As a file 202 is received by the system, its affidavit is checked against the signatures in the user signature data structure 120 and in the system signature data structure 122. The file must pass both tests before it can be stored by the system.

File 202 contains two parts: a file portion 204, which contains executable programs or data, and an affidavit portion 206, which contains an encrypted checksum 210 and other administrative data 208. Administrative data 208 includes the real identity of the creator of the affidavit, identifiers or pointers to other associated affidavits, dates and times of creation and expiration of the affidavit, and identifies co-signers of the affidavit. In some implementations, affidavit 206 is a part of file 202 and in other implementations, affidavit 206 is a separate file that is associated with file portion 204. For example, affidavit 206 can be incorporated into some file formats as a comment line. Other file formats may allow the affidavit to be closely coupled to the file portion 204 in some known manner.

FIG. 3 shows an example of a signature data structure of FIG. 1. Both user signature data structures and system signature data structures preferably have the same organization, and the format of FIG. 3 is used for both. The user signature data structure-represents sources that the user has indicated are trustworthy and the system signature data structure represents sources that the system considers to be trustworthy. In the example, each entry in the signature data structure has a name of a trusted entity 302, a type 304 of the entry (e.g., single entry or indirect database entry), a public key 306, and a series of values 308 indicating the type or types of permissions the entity has for the system (e.g., create, delete, read, write, execute, etc.). Every file access (e.g., every file open and delete operation) is checked against both the user and system data structures by the file system before the file access is allowed by the file system.

Figure 4A:
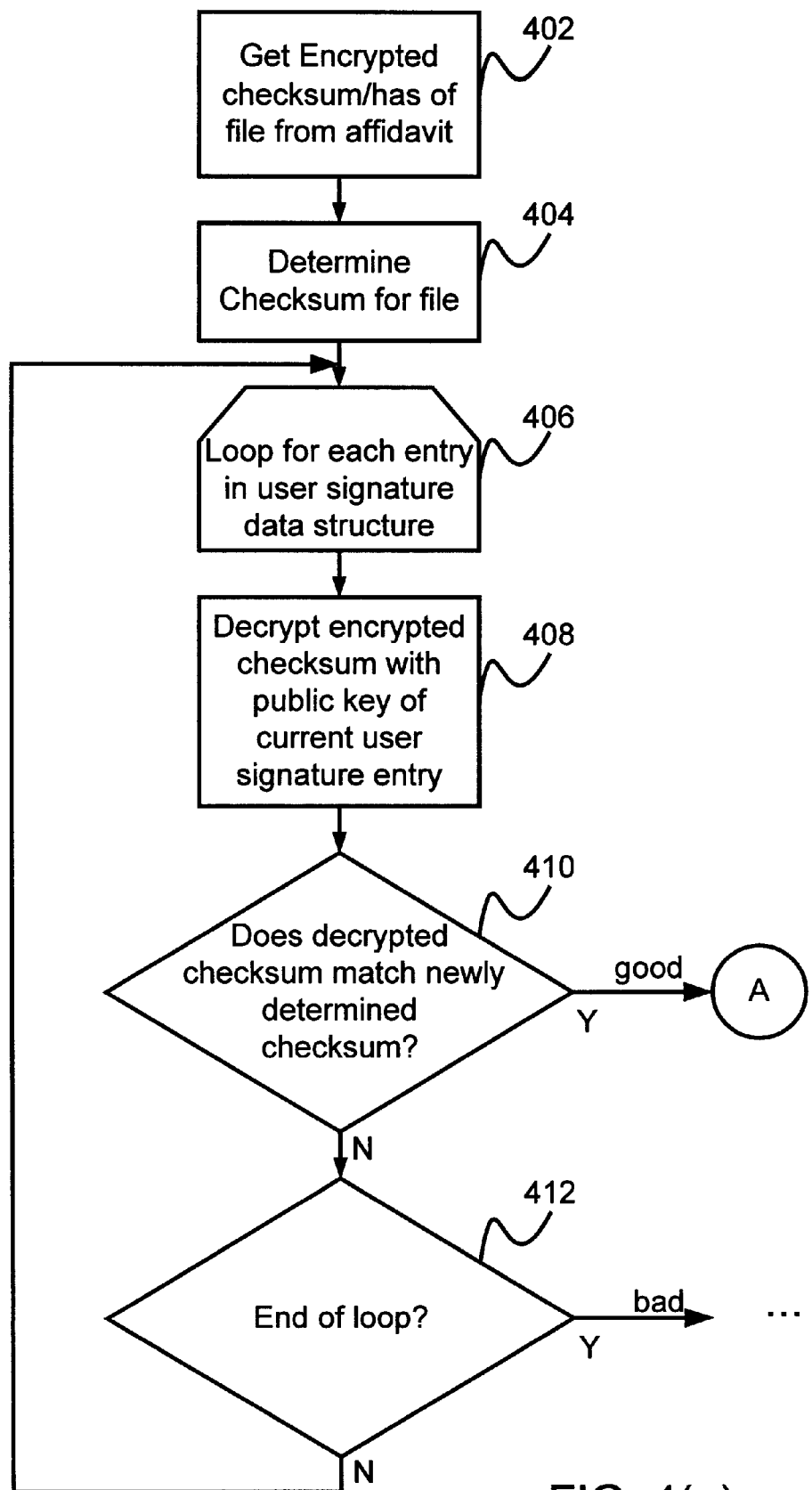
FIGS. 4(a) and 4(b) are flow charts showing how files are checked against the user signature data and the system signature data.
Figure 4B:
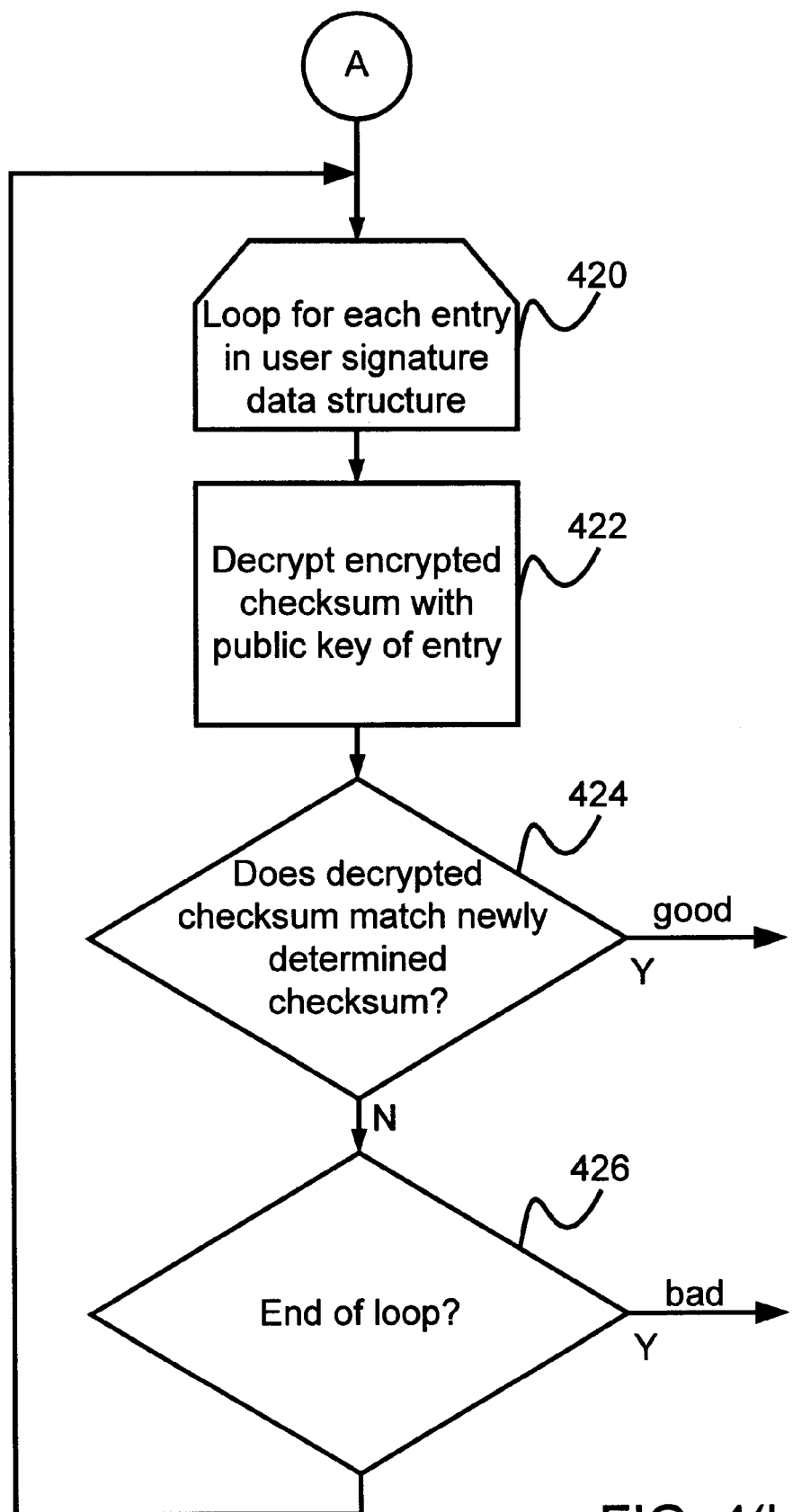

FIGS. 4(a) and 4(b) are flow charts showing how files are checked against the user signature data and the system signature data by the file system. In the preferred embodiment, all files received by the system from an outside source must include an affidavit. Similarly, each file created and stored by the file system must have an associated affidavit. In some implementations, the affidavit is a part of the file. In other implementations, the affidavit is associated with the file. Thus, the affidavit of a file is checked whenever a file operation is performed for the file. For example, the affidavit is checked when the file is created or loaded into memory. The affidavit also is checked when the file is read from, written to, or deleted. Such a process serves two goals: 1) to protect the file system from outsiders who wish to compromise files and 2) to protect users of the system from accessing or relying on files that have been tampered with. It will be understood by persons of ordinary skill in the art that the steps of FIGS. 4(a) and 4(b) are performed by CPU 102 of FIG. 1 executing instructions of the file system/operating system that are stored in memory 104. The steps of FIGS. 4(a) and 4(b) preferably are performed each time a file access is requested In step 402 of FIG. 4(a), the file system gets the encrypted checksum 206 associated with the file. In step 404, the file system repeats the calculation of the checksum for the file using any known checksum method that was used to determine the affidavit. Steps 406–412 are repeated for each entry in the user signature data structure (or until a match is found).

In step 408, the file system decrypts the encrypted checksum 214 of the affidavit using the public key of the current user signature data structure entry. Because the affidavit was created with the entity's private key, decryption of the affidavit using the entity's correct public key should yield a decrypted checksum for the file. Decryption using other public keys should yield an incorrect checksum If in step 410, the decrypted checksum matches the checksum determined in step 404, then the affidavit represents an entity considered trustworthy by the user and the file has not been tampered with. Thus, control passes to FIG. 4(b). If no match is found after checking the entire user signature data structure, then the entity is not trusted and the file operation is denied.

Steps 420–426 are repeated for each entry in the system signature data structure (or until a match is found). In step 422, the file system decrypts the encrypted checksum 210 of affidavit 206 using the public key of the current system signature data structure entry. If, in step 424, the decrypted checksum matches the checksum determined in step 404, then the affidavit represents an entity considered trustworthy by the system and the file operation is allowed. If no match is found after checking the entire system signature data structure, then the entity is not trusted and the file operation is denied.

Some implementations of the present invention also include a "default" entry in one or more of their signature data structures. For example, as shown in FIG. 3, entry 320 contains the entity "any" and allows the entity permission to read files. Thus, if FIG. 3 represents the user signature data structure, the user has indicated that he gives permission to any entity to open a file in read-only mode. In this example, for such a file operation to actually be allowed by the file system, the system signature data structure must also allow the access. In yet another implementation, either of the signature data structures may contain a "not entity" entry, indicating that a certain entity is not allowed to make certain file accesses (even if an "any" entity is also present in one of the signature data structures).

The "type" field of FIG. 3 allows the signature data structure to reference public keys stored in another part of the system, such as in a data base or another signature data structure stored elsewhere on the computer. For example, users may share a common signature data structure. Thus, in FIG. 3, the user has decided to allow access by the entities owning all of the public keys in "Geoffs" database. In some implementations, the user must be an entity trusted by Geoffs database in order to access public keys therefrom.

In a preferred embodiment of the present invention, the encryption scheme used is the Digital Signature Algorithm (DSA), described in Schneier, "Applied Cryptography: Protocols, Algorithms, and Source Code in C," second edition, 1996, pp. 483–495, which is herein incorporated by reference. In another embodiment, the encryption scheme used is the SHA-1 scheme.

In a preferred embodiment of the present invention, one or both or the user signature data structure and the system signature data structure are stored on a PCMCIA card or some other removable storage medium. Thus, the user simply inserts his PCMCIA card to personalize the user and/or system signature data structures of the computer that he is working on. In such an implementation, of course, the file system must know that the signature data structures are so stored.

Figure 5:
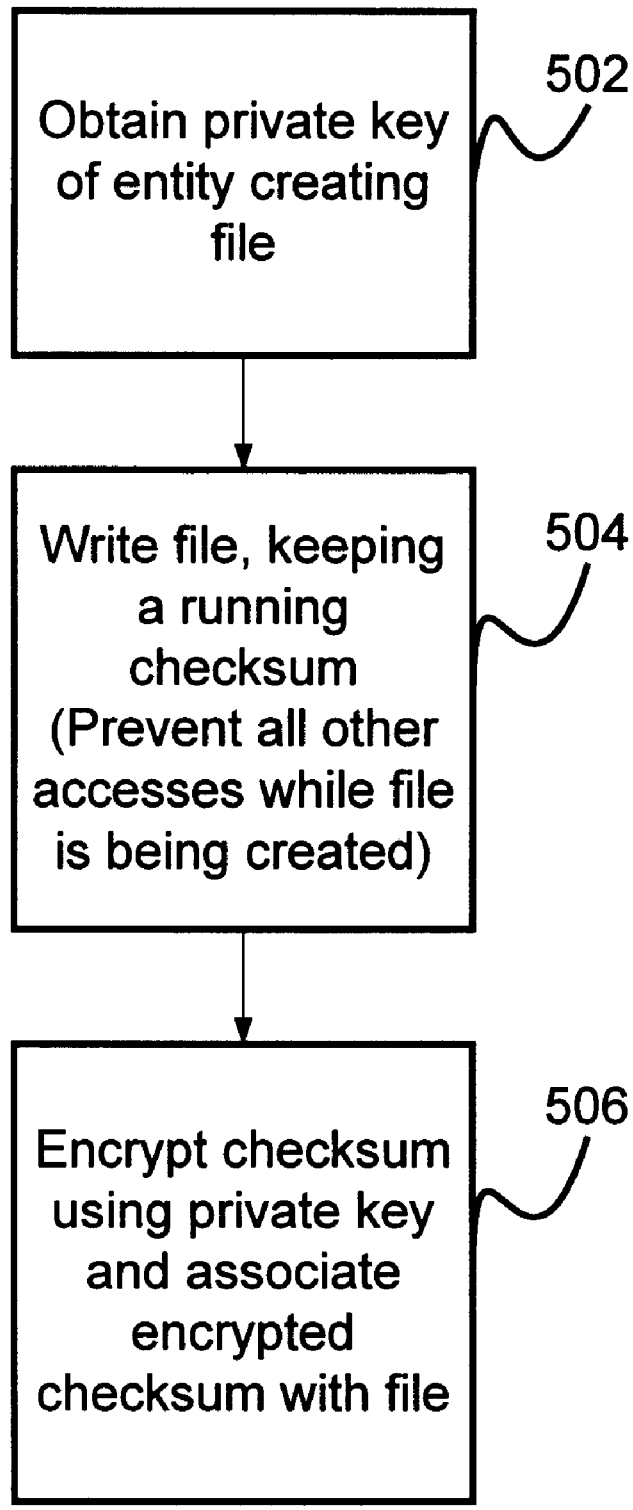
FIG. 5 is a flow chart of steps used to create signed files in a preferred embodiment of the present invention.

FIG. 5 is a flow chart of steps used to create signed files in a preferred embodiment of the present invention, when the files are created by the computer system 100. It, for example, files are created on another system and loaded into computer system 100 via the internet or a floppy disk or other portable or networked media, the files must have already been created and must have an affidavit associated therewith to be accepted by computer system 100. FIG. 5, however, deals with the situation when the user wishes to create a file on computer system 100.

In step 502, the system obtains a private key of the entity creating the file. This may be the user's private key if the user is creating the file directly or if the user is running software that creates a file (e.g., word processing software). In a preferred embodiment, the user is prompted for his private key and the user types his private key into the system or inserts a storage device on which his private key is stored. Alternately, private keys of users can be stored in a protected part of computer system 100. Alternately, a user may be required to enter a pin number before the system looks up the user's private key from a protected memory. In step 504, the file is created and written to storage, while the file system maintains a running checksum of the data in the file. A "running checksum" is a checksum that is continuously updated as the file is written. The system prevents file accesses by others while the file is being created. In some cases, portions of the file may be written to an external storage medium during file creation. This situation occurs, for example, when the created file is large.

It should be noted that a potential problem can occur if data is written to an external storage device during file creation, but the file creation operation is not completed. In this case, data will exist on the external storage medium, but the data will not have an associated affidavit. In a preferred embodiment, the file system is not allowed to access such files. Aborting the write/creation of the file before the affidavit is created causes the system to destroy the partially written file.

In step 506, the file system encrypts the checksum from step 504 using the user's private key and writes the checksum to the storage medium, either as a part of the file or associated with the file, depending on the implementation. Thus, all files created by the file system of the described embodiment have an associated affidavit. In a preferred embodiment, each time a file is written to, its checksum must be recompute and its affidavit recalculated using the private key of the creating entity. Some implementations wait until a file is closed before recomputing the affidavit. Again, a problem can arise if an error occurs during the write, but before the affidavit can be created and stored in association with the written file. Once a file is created, it can only be opened or deleted by an entity that passes the two-tier validation test of FIGS. 4(a) and 4(b).

In yet another embodiment, the system allows a user to create two types of files: verified and unverified files. Verified files are required to have an associated affidavit and are validated as described above for each file operation. Non-verified files do not require verification before each file operation In another preferred embodiment, files can be opened in either "verified" or "unverified" mode. In this embodiment, the file system would most likely have two "open" routines—one that requires verification of files that it opens and one that does not.

Files that are downloaded, e.g., over the internet or from a floppy disk, retain the affidavits that they had when they were received by the system must be preceded and accompanied by an affidavit.

Figure 6:
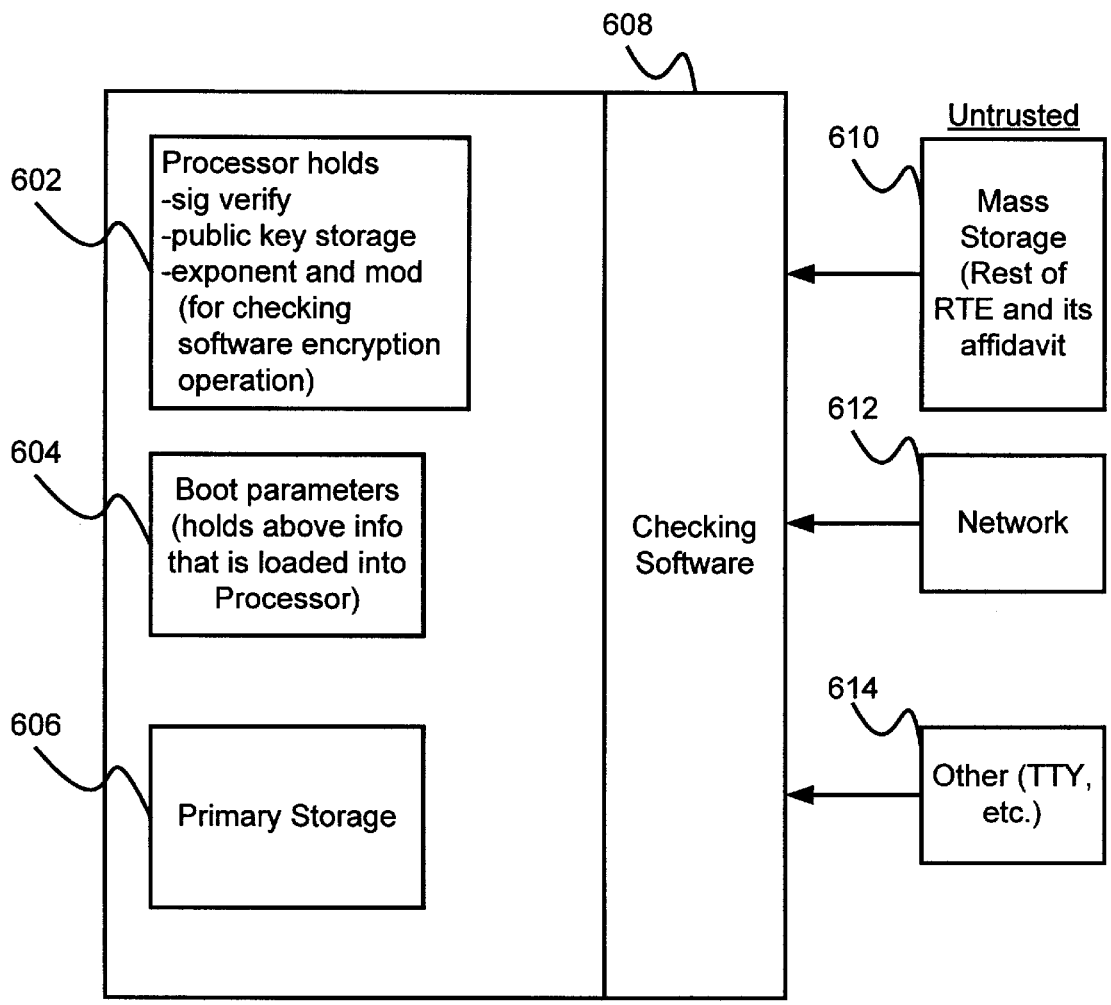
FIG. 6 is a block diagram of another preferred embodiment of the present invention in which the majority of the operating system must be verified before the system can be booted.

FIG. 6 is a block diagram of another preferred embodiment of the present invention in which the majority of the runtime environment (e.g., an operating system or interpreter) must be verified as described above before the system can be booted. In FIG. 6, a small amount of program data is stored in a boot ROM 604. The CPU 602 loads a signature of the runtime environment and basic software for computing a checksum and decrypting an affidavit. At boot time, the remainder of the runtime environment is loaded from secondary mass storage 610, along with its affidavit (which is an encrypted checksum). The CPU computes the checksum of the runtime environment code as it is loaded and decrypts the affidavit using the public key from the boot ROM. If the checksum and the decrypted checksum match, the runtime environment load is completed. The loaded runtime environment includes the checking software 608, which is used as described in FIGS. 4(a), 4(b), and 5 during operation of the system.

In summary, the described embodiment of the present invention incorporates two or more levels or signatures. A file access must satisfy both levels before it is allowed by the file system. In addition, both the user and the system may specify multiple trusted entities that are allowed to perform file accesses in the system. Trusted entities are specified for the system, not on a file by file basis. Various entities, however, can have various permissions associated therewith.

Although the embodiments discussed involved "files" a person of ordinary skill in the art will understand that the present invention could also be implemented in an object oriented environment.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of performing a file access, comprising the steps, performed by a data processing system having a memory, of:
   receiving an indication that an entity desires to perform a file access operation on a file of the data processing system;
   obtaining a cryptographic affidavit of the file;
   checking that the cryptographic affidavit is acceptable in accordance with a user signature data structure stored in the memory;
   checking that the cryptographic affidavit is acceptable in accordance with a system signature data structure stored in the memory; and
   allowing the file access operation when the cryptographic affidavit is acceptable in accordance with both the user signature data structure and the system signature data structure.

2. The method of claim 1,
   wherein the receiving step includes the step of receiving an indication that a file user wishes to download a file,
   wherein the step of obtaining a cryptographic affidavit of the file includes the step of obtaining a cryptographic affidavit associated with the file and created using a private key of an entity that provided the file, and
   wherein the first and second checking steps include the steps of checking whether the entity is a trusted entity for both the user and the system.

3. The method of claim 1,
   wherein the receiving step includes the step of receiving an indication that a file user wants to access an existing file of the data processing system, and
   wherein the step of obtaining a cryptographic affidavit of the file includes the step of obtaining a cryptographic affidavit associated with the file and created using a private key of the file user, and
   wherein the first and second checking steps include the steps of checking whether the file user is a trusted entity for both the user and the system.

4. A method of creating a secure file, comprising the steps, performed by a data processing system having a memory, of:
   receiving an indication that an entity desires to perform a file create operation on a file of the data processing system;
   obtaining a private key of the entity;
   receiving data of the file to be created;
   determining a checksum of the file;
   encrypting the checksum using the private key; and
   creating the file and an associated cryptographic affidavit that includes the encrypted checksum.

5. A signature data structure stored in a memory of a data processing system, comprising:
   a first entity field storing a name of an entity trusted to perform a file access;
   a first public key field storing a public key of the first entity;
   a second entity field storing a name of an entity trusted to perform a file access; and
   a second public key field storing a public key of the second entity.

6. The data structure of claim 5, further including:
   a type field indicating that additional public key information is stored in a data base.

7. The data structure of claim 5, further including a first permission field, indicating one or more types of file access operations that can be performed by the first entity.

8. The data structure of claim 7, further including a second permission field, indicating one or more types of file access operations that can be performed by the second entity.

9. The data structure of claim 5, wherein at least one of the first and second entity field contains a value of "any", indicating that any entity can perform the file access.

10. The data structure of claim 5, wherein at least one of the first and second entity field contains a value of "no" and a wherein at least one of the first and second entity field contains a permission field, the entity field and the permission field together indicating that no entity can perform a file access operation indicated in the permissions field.

11. The data structure of claim 5, further comprising a plurality of first entity fields and first public key fields.

12. The data structure of claim 11, further comprising a plurality of second entity fields and second public key fields.

13. An apparatus for performing a file access, comprising:
   a memory storing a user signature data structure and a system signature data structure;
   a user input portion configured to receive an indication that a file user desires to perform a file access operation on a file having an associated cryptographic affidavit;
   a checking portion configured to check that the cryptographic affidavit is acceptable in accordance with the user signature data structure;
   a checking portion configured to check that the cryptographic affidavit is acceptable in accordance with the system signature data structure; and
   a file access portion that allows the file access operation only when the cryptographic affidavit is acceptable in accordance with both the user signature data structure and the system signature data structure.

14. The apparatus of claim 13,
   wherein the user input portion includes a portion configured to receive an indication that a user wishes to download a file, and
   wherein the cryptographic affidavit of the file was created using a private key of an entity that provided the file, and
   wherein the first and second checking portions include a portion configured to check whether the entity is a trusted entity for both the user and the system.

15. The apparatus of claim 13,
   wherein the user input portion includes a portion configured to receive an indication that a file user wants to access an existing file on the data processing system, and
   wherein the cryptographic affidavit was created using a private key of the file user, and
   wherein the first and second checking steps include the steps of checking whether the file user is a trusted entity for both the user and the system.

16. A computer program product, comprising:
   a computer usable medium having computer readable code embodied therein for performing a secure file access, the computer program product comprising:
   computer readable program code devices configured to cause a computer to effect receiving an indication that an entity desires to perform a file access operation on a file of the data processing system;

computer readable program code devices configured to cause a computer to effect obtaining a cryptographic affidavit of the file;

computer readable program code devices configured to cause a computer to effect checking that the cryptographic affidavit is acceptable in accordance with a user signature data structure stored in the storage medium;

computer readable program code devices configured to cause a computer to effect checking that the cryptographic affidavit is acceptable in accordance with the system signature data structure stored in the storage medium; and computer readable program code devices configured to cause a computer to effect allowing the file access operation when the cryptographic affidavit is acceptable in accordance with both the user signature data structure and the system signature data structure.

17. A computer program product, comprising:

a computer usable medium having computer readable code embodied therein for performing a file access, the computer program product comprising:

computer readable program code devices configured to cause a computer to effect receiving an indication that an entity desires to perform a file access operation on a file of the data processing system;

computer readable program code devices configured to cause a computer to effect obtaining a private key of the entity;

computer readable program code devices configured to cause a computer to effect receiving data of the file to be created;

computer readable program code devices configured to cause a computer to effect determining a checksum of the file;

computer readable program code devices configured to cause a computer to effect encrypting the checksum using the private key; and computer readable program code devices configured to cause a computer to effect creating the file and an associated cryptographic affidavit that includes the encrypted checksum.

* * * * *